UNITED STATES PATENT OFFICE.

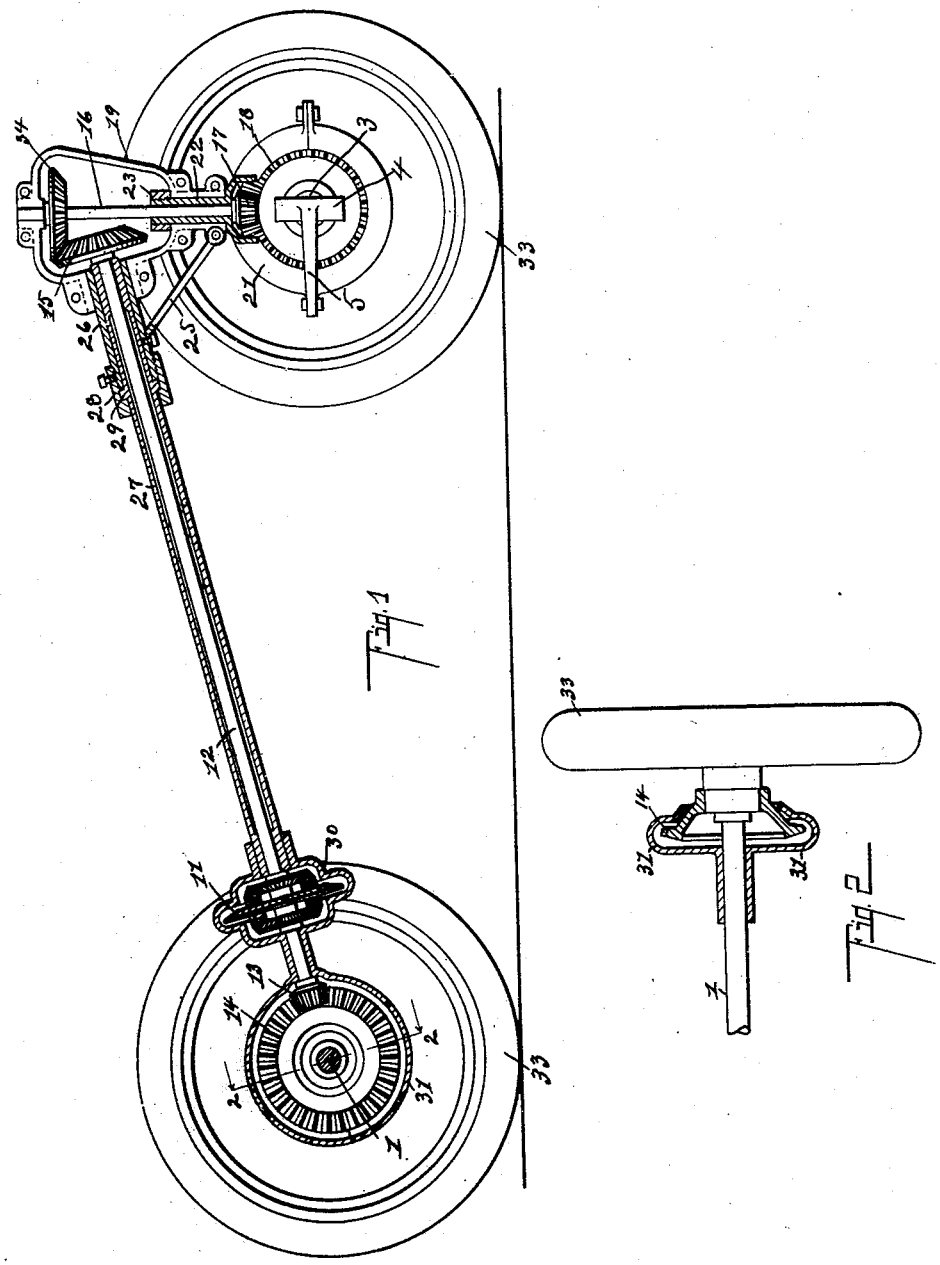

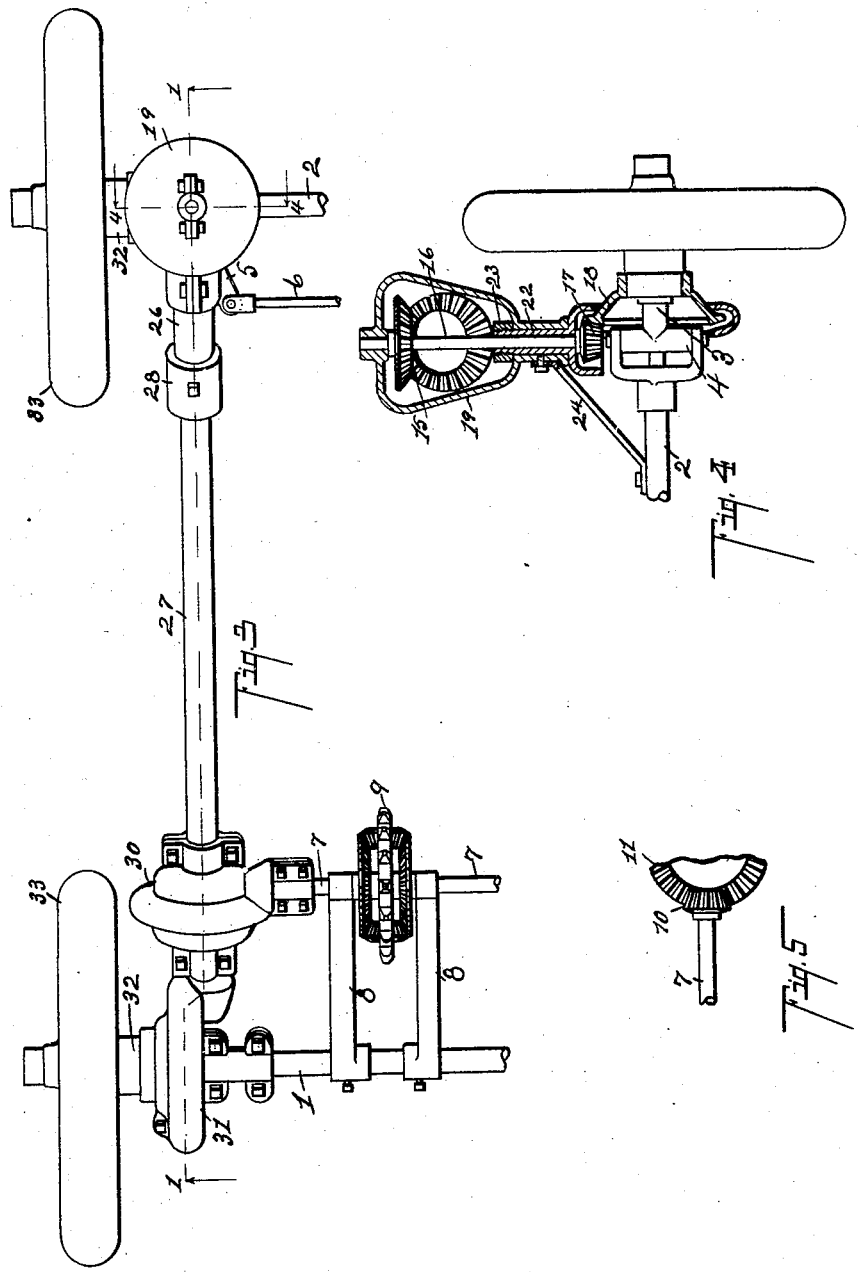

CARSON DURKEE, OF VICKSBURG, MICHIGAN.

MOTOR-VEHICLE.

No. 917,422.   Specification of Letters Patent.   Patented April 6, 1909.

Application filed January 9, 1907. Serial No. 351,554.

*To all whom it may concern:*

Be it known that I, CARSON DURKEE, a citizen of the United States, residing at the village of Vicksburg, county of Kalamazoo, State of Michigan, have invented certain new and useful Improvements in Motor-Vehicles, of which the following is a specification.

This invention relates to improvements in motor vehicles.

The objects of this invention are,—first, to provide in a motor vehicle an improved driving gear whereby power is delivered to all of the carrying wheels; second, to provide an improved motor vehicle embodying these features, which is comparatively simple in structure and strong and durable.

Further objects, and objects relating to structural details will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a longitudinal section of a structure embodying the features of my invention, taken on a line corresponding to line 1—1 of Fig. 3. Fig. 2 is a detail section taken on a line corresponding to line 2—2 of Fig. 1. Fig. 3 is a detail plan of a structure embodying the features of my invention. Fig. 4 is a vertical section taken on a line corresponding to line 4—4 of Fig. 3. Fig. 5 is an enlarged detail showing the relation of the driving shaft to the gear 11.

In the drawing, all of the sectional views are taken looking in the direction of the little arrows at the ends of the section lines, and similar reference characters refer to similar parts throughout the several views.

Referring to the drawing, 1 is the rear axle, and 2 the forward axle. The forward axle is provided with spindles 3, which are pivotally secured to the axle by pivot members 4. The arms 5 project rearwardly from these pivot members and are connected by a rod 6, as is common in structures of this class. A driving shaft, made up of sections 7—7 is preferably supported on forwardly projecting brackets carried by the rear axle. The driving sprocket 9 is a member of the compensating driving gear by which these sections are connected. The driving shaft sections are provided with beveled pinions 10, which are arranged to mesh with the main gears 11 of the compensating gears by which the sections of the driven shafts 12 are connected.

In the accompanying drawing, I show only two wheels, with driving connections therefor, it being understood that the driving connections for the opposite side are substantial duplicates thereof. On the rear sections of the shafts 12 are beveled pinions 13 arranged to mesh with the beveled gears 14 connected to the rear wheels preferably by mounting on the hubs thereof. On the forward sections of the shafts 12 are beveled gears 15 arranged to mesh with the gears 34 on the vertically-arranged shafts 16, the axes of which are arranged to co-incide with the axes of the pivots for the spindles of the forward axle. On the lower ends of the shafts 16 are beveled pinions 17 arranged to mesh with the gears 18 on the hubs of the forward wheels.

The shafts 12 are inclosed in suitable tubular housings 27 at one end of which are the housings 30 for the compensating gears connecting the same to the driving shaft and at the other, the housings 19 for the shafts 16 and their gears. As a convenient means for connecting the housings or casings 27 of the shafts 12 to the housings 19 of the shafts 16 and their gears, I provide the housings 19 with projecting sleeves 26 into which the ends of the casings 27 are inserted. The housings 27 are provided with annular flanges 29 which are engaged by collars 28 threaded upon the sleeves 26 thereby effectively securing the parts together. The parts are preferably made rigid by braces 25; see Fig. 1. The bearings 22 for the shafts 16 are preferably inserted through the bottom of the housings 19 and secured therein by nuts 23 threaded upon the upper end thereof. The bearings 22 preferably form part of the housings 21 so that the housings 21 for the gears 18 are supported in proper relation.

The compensating gear connections for the shaft sections 12 are provided with housings 30 secured upon the rear ends of the housings 27 for the shafts. The housings 31 for the gears 14 are secured to the rear axle and to the housings 30 for the compensating gears of the driven shafts. This arrangement secures all of the parts together and effectively holds the gears in their proper relation; also the parts are effectively embraced so that the structure is very strong and durable. With the parts thus arranged the power is delivered to all four of the carrying wheels 33 and with the compensating gears arranged as described, the vehicle may be turned in any manner or the wheels pass over obstructions without skidding the same.

I have illustrated and described my improved motor vehicle in detail in the form preferred by me on account of its structural simplicity and strength. I am, however, aware that it is capable of considerable variation in structural details without departing from my invention.

Having thus described my invention, what I claim as new and desire to secure by Letters Patent is:

1. The combination with the front and rear axles, of pivoted spindles for the said front axles; wheels; gears connected to said wheels; a driving shaft made up of sections; a compensating gear driving connection for said driving shaft sections; driven shafts made up of sections; compensating gear connections for said driven shaft sections to the sections of said driving shaft; gears on the rear sections of said driven shafts arranged to mesh with the said gears connected to the rear wheels; vertical shafts arranged with their axes co-inciding with the pivots of the said spindles of the front axle; gears on said vertical shafts arranged to mesh with the said gears connected to the front wheels; connecting gears for said vertical shafts to the forward sections of said driven shafts; housings for the gears connected to the forward wheels having upwardly projecting bearings therein for said vertical shafts; housings for said vertical shafts and the said connecting gears therefor to said driven shafts arranged upon said vertical shaft bearings; housings for the said compensating gear connections for said driven shafts; housings for said driven shafts to said housings for said vertical shafts and to said housings for said compensating gear; and housings for the said gears connected to the rear wheels connected to said compensating gear housings whereby the parts are protected and held in position.

2. The combination with the front and rear axles, of pivoted spindles for the said front axle; gears connected to said wheels; a driving shaft; compensating gear connections for said driven shaft sections to the said driving shaft; gears on the rear sections of said driven shafts arranged to mesh with the said gears connected to the rear wheels; vertical shafts arranged with their axes co-inciding with the pivots of the said spindles of the front axle; gears on said vertical shafts arranged to mesh with the said gears connected to the front wheels; connecting gears for said vertical shafts to the forward sections of said driven shafts; housings for the gears connected to the forward wheels having upwardly projecting bearings therein for said vertical shafts; housings for said vertical shafts and the said connecting gears therefor to said driven shafts arranged upon said vertical shaft bearings; housings for the said compensating gear connections for said driven shafts; housings for said driven shafts to said housings for said vertical shafts and to said housings for said compensating gear; and housings for the said gears connected to the rear wheels connected to said compensating gear housings whereby the parts are protected and held in position.

3. The combination with the front and rear axles, of pivoted spindles for the said front axles; wheels; gears connected to said wheels; a driving shaft made up of sections; a compensating gear driving connection for said driving shaft sections; driven shafts made up of sections; compensating gear connections for said driven shaft sections to the sections of said driving shaft; gears on the rear sections of said driven shafts arranged to mesh with the said gears connected to the rear wheels; vertical shafts arranged with their axes co-inciding with the pivots of the said spindles of the front axle; gears on said vertical shafts arranged to mesh with the said gears connected to the front wheels; connecting gears for said vertical shafts to the forward sections of said driven shafts; housings for the gears connected to the forward wheels; housings for said vertical shafts and the said connecting gears therefor to said driven shafts connected to said housings for said gears connected to said forward wheels; housings for the said compensating gear connections for said driven shafts; housings for said driven shafts to said housings for said vertical shafts and to said housings for said compensating gear; and housings for the said gear connected to the rear wheels connected to said compensating gear housings whereby the parts are protected and held in position.

4. The combination with the front and rear axles, of pivoted spindles for the said front axle; wheels; gears connected to said wheels; a driving shaft; compensating gear connections for said driven shaft sections to the said driving shaft; gears on the rear sections of said driven shafts arranged to mesh with the said gears connected to the rear wheels; vertical shafts arranged with their axes coinciding with the pivots of the said spindles of the front axle; gears on said vertical shafts arranged to mesh with the said gears connected to the front wheels; connecting gears for said vertical shafts to the forward sections of said driven shafts; housings for the gears connected to the forward wheels; housings for said vertical shafts and the said connecting gears therefor to said driven shafts connected to said housings for said gears connected to said forward wheels; housings for the said compensating gear connections for said driven shafts; housings for said driven shafts to said housings for said vertical shafts and to said housings for said compensating gear; and housings for the said gears connected to the rear wheels connected to said compensating gear housings whereby the parts are protected and held in position.

5. The combination with the front and rear axles; pivoted spindles for said axles; a pair of shafts; gear connections therefor to said spindles; and housings for said shafts and gear connections whereby the parts are protected and held in position.

6. The combination with the axles, of wheels; a pair of driven shafts made up of sections; compensating gear connections for said driven shaft sections; a driving shaft; compensating gear connections for said driving shaft to said driven shafts; gear connections for said driven shafts to said wheels; and housings for said driven shafts and gear connections whereby the parts are connected and supported.

7. The combination with the axles, of wheels; a pair of driven shafts made up of sections; compensating gear connections for said driven shaft sections; a driving shaft; gear connections for said driven shafts to said wheels; and housings for said driven shafts and gear connections whereby the parts are connected and supported.

8. The combination with an axle, of wheels; a pair of driven shafts; a driving shaft; compensating gear connections for said driving shaft to said driven shaft; gear connections for said driven shafts to said wheels; and housings for said shafts and gear connections whereby the parts are connected and supported.

9. The combination with the front and rear axles, of wheels; driven shafts; driving connections therefor to said wheels; and housings for said driven shafts and gear connections whereby the parts are protected and held in position.

In witness whereof, I have hereunto set my hand and seal in the presence of two witnesses.

CARSON DURKEE. [L. S.]

Witnesses:
   CHARLES A. MERRELL,
   LULU GREENFIELD.